United States Patent
Lee

(10) Patent No.: US 8,354,617 B2
(45) Date of Patent: Jan. 15, 2013

(54) COOLANT TEMPERATURE CONTROL APPARATUS FOR A WET SAW

(76) Inventor: Jung Kook Lee, Manassas, VA (US)

( * ) Notice: Subject to any disclaimer, the term of this patent is extended or adjusted under 35 U.S.C. 154(b) by 626 days.

(21) Appl. No.: 12/582,972

(22) Filed: Oct. 21, 2009

(65) Prior Publication Data

US 2011/0089155 A1    Apr. 21, 2011

(51) Int. Cl.
*H05B 3/00* (2006.01)
(52) U.S. Cl. ......... 219/241; 83/171; 392/451; 392/459
(58) Field of Classification Search .......... 219/241
See application file for complete search history.

(56) References Cited

U.S. PATENT DOCUMENTS

| 6,386,948 B1 * | 5/2002 | Kondo | 451/28 |
| 7,392,926 B2 * | 7/2008 | Teraoka | 228/56.1 |

* cited by examiner

*Primary Examiner* — Stephen W Smoot
(74) *Attorney, Agent, or Firm* — Ohlandt, Greeley, Ruggiero & Perle, L.L.P.

(57) ABSTRACT

A coolant temperature control apparatus for a wet saw is provided, in which a coolant temperature controller is mounted on the wet saw to heighten the temperature of the coolant to a set temperature, and thus a tile cutting work can be efficiently performed even in cold weather below zero with the work continuity heightened. The coolant temperature control apparatus for a wet saw includes a support member on which a material to be cut is arranged, an electric cutting device cutting the material arranged on the support member, a coolant supply device cooling heat generated during operation of the electric cutting device, and a coolant temperature controller heightening the temperature of coolant stored in the coolant supply device.

11 Claims, 3 Drawing Sheets

COOLANT TEMPERATURE CONTROL APPARATUS FOR A WET SAW

BACKGROUND OF THE INVENTION

1. Field of the Invention

The present invention relates to a coolant temperature control apparatus for a wet saw, and more particularly, to a coolant temperature control apparatus for a wet saw, which can prevent coolant from freezing and operator's hands from getting cold even in cold weather and thus can facilitate the use of the wet saw by heightening the temperature of the coolant stored in the wet saw to a set temperature.

2. Description of the Prior Art

In general, in the case of constructing tiles on a wall or floor surface, it is sometimes required to cut tiles in constructing the tiles on an outline part or a corner part of the wall or floor surface, and in this case, the tiles are cut with a desired size by using a wet saw.

That is, since building materials, such as stones or tiles, used as floor materials, finishing materials, and the like, are pre-provided with fixed thickness and size, they may be cut with a desired size by using the wet saw in a work spot.

FIG. 1 is a perspective view illustrating a conventional wet saw.

As illustrated in FIG. 1, the conventional wet saw includes a base member 10, a guide rail 20 mounted on an upper surface of the base member 10, a support member 30 slidably engaged with the guide rail 20 to accommodate a tile (not illustrated) thereon, and an electric cutting device 40 cutting the tile on the support member 30 by using a cutter blade 42 rotating through a driving force of a motor 41.

That is, the conventional wet saw cuts the tile arranged on the support member 30 by sliding the support member 30 along the guide rail 20 in a direction where the cutter blade 42 of the electric cutting device 40 is positioned.

During the cutting of the tile through the cutter blade 42, a high-heat is generated, and due to this high heat, the cutter blade 42 may be damaged.

In order to prevent this, the wet saw is provided with a coolant supply device that supplies coolant to a part where the cutter blade 42 and the tile are in close contact with each other to cool the generated heat.

The coolant supply device includes a coolant accommodating space 11 formed on the upper surface of the base member 10, a pump (not illustrated) pumping the coolant accommodated in the coolant accommodating space 11, and a coolant hose 43 spraying the coolant pumped by the pump on the part where the cutter blade 42 and the tile (not illustrated) are in close contact with each other.

However, in the case of using the wet saw having the coolant supply device in cold weather below zero, such as in the winter season, the coolant accommodated in the coolant accommodating space or the coolant passing through the coolant hose 43 may be frozen, and thus the coolant cannot be used.

Also, even in cold weather above zero, in which the coolant is not frozen, operator's hands are spattered with cold coolant by the rotating force of the cutter blade 42, and thus the work continuity is lowered since the operator's hands get cold.

In order to solve the problems occurring during the tile work, hot water separately prepared may be continuously supplied.

SUMMARY OF THE INVENTION

Accordingly, the present invention has been made to solve the above-mentioned problems occurring in the prior art while advantages achieved by the prior art are maintained intact.

One object of the present invention is to provide a coolant temperature control apparatus for a wet saw, which can prevent coolant from freezing and operator's hands from getting cold even in cold weather below zero and thus can improve the efficiency of cutting work by automatically heightening the temperature of the coolant stored in the wet saw to a set temperature.

In order to accomplish this object, there is provided a coolant temperature control apparatus for a wet saw, according to an embodiment of the present invention, which includes a support member on which a material to be cut is arranged; an electric cutting device cutting the material arranged on the support member; a coolant supply device cooling heat generated during operation of the electric cutting device; and a coolant temperature controller heightening the temperature of coolant stored in the coolant supply device.

The coolant temperature controller may include a power supply connector, a transformer detecting current applied from the power supply connector, a heating element heightening the temperature of the coolant stored in the coolant supply device by using the current applied to the transformer, and a microprocessor controlling the temperature of the coolant by controlling the current applied to the heating element.

The coolant temperature controller may be detachably mounted on one side of an outer surface of the wet saw, and the heating element may be positioned in the coolant stored in the coolant supply device.

The coolant temperature controller may further include a temperature sensor measuring the temperature of the coolant stored in the coolant supply device and transferring the measured temperature to the microprocessor, wherein the microprocessor may control the current applied to the heating element on the basis of the measured temperature transferred from the temperature sensor.

The coolant temperature controller may further include a display part displaying the measured temperature of the coolant transferred to the microprocessor through the temperature sensor.

The coolant temperature controller may further includes a triac intercepting for supplying the current applied to the heating element if the temperature of the coolant stored in the coolant supply device is high or low, wherein the microprocessor may control the temperature of the heating element by using the triac.

The coolant temperature controller may heighten the temperature of the coolant stored in the coolant supply device by 1° C. to 15° C.

The coolant temperature controller may temporarily be brought to a standstill when the electric cutting device is operated.

The coolant supply device may include a base member on which a coolant accommodating space is formed, a pump pumping the coolant accommodated in the coolant accommodating space, and a coolant hose spraying the coolant pumped by the pump on a part where a cutter blade and a material to be cut are in close contact with each other, and the coolant temperature controller may further include an auxiliary heating element provided in the coolant hose to heat the coolant passing through the coolant hose.

The support member may be mounted on a guide rail installed on an upper surface of the base member to be slid along the guide rail.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE PREFERRED EMBODIMENTS

Hereinafter, a coolant temperature control apparatus for a wet saw according to a preferred embodiment of the present invention will be described in detail with reference to the accompanying drawings. In the following description of the present invention, detailed description of the same constituent elements as those of the conventional wet saw will be omitted.

Figure 1:
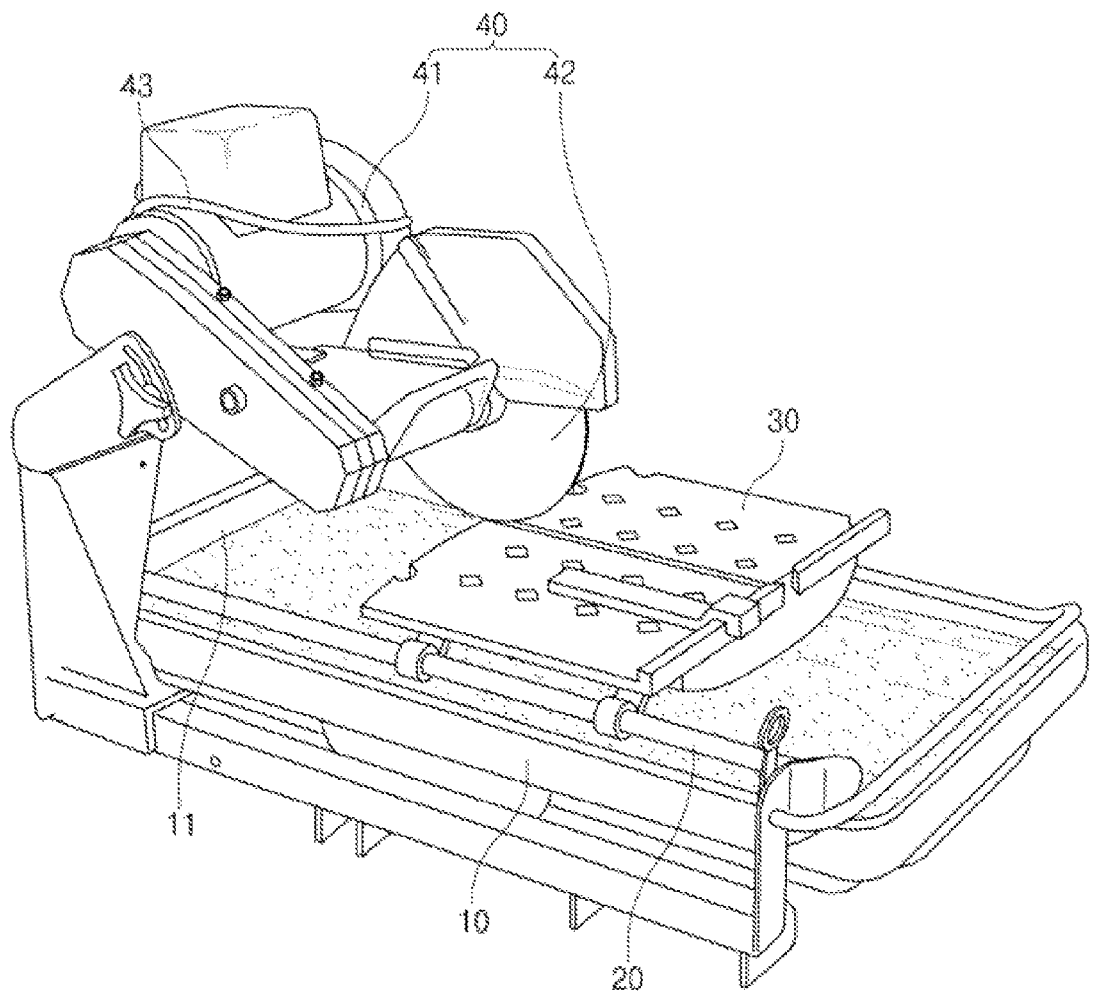
FIG. 1 is a perspective view illustrating a conventional wet saw.
Figure 2:
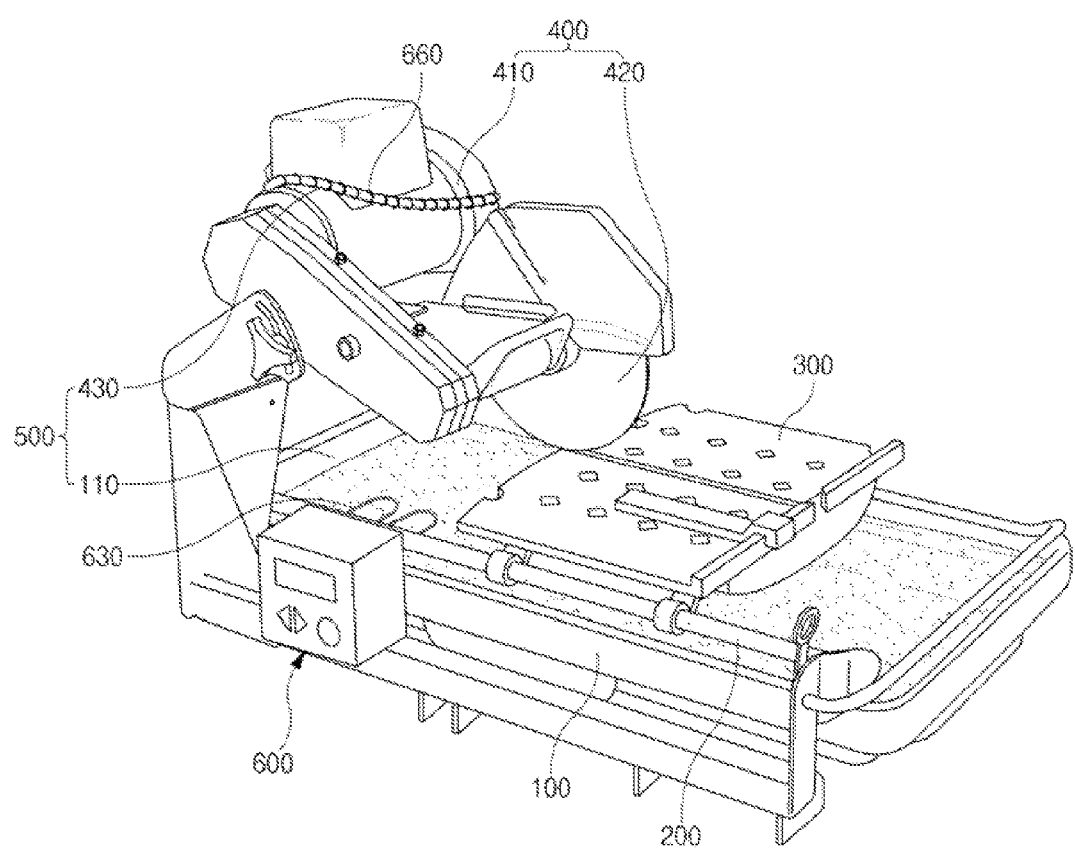
FIG. 2 is a perspective view illustrating a coolant temperature control apparatus for a wet saw according to an embodiment of the present invention.

As illustrated in FIG. 2, a wet saw according to an embodiment of the present invention is to cut a material with a desired size, and includes a base member 100, a guide rail 200, a support member 300, an electric cutting device 400, and a coolant supply device 500.

On the set saw, a coolant temperature controller 600 for heightening the temperature of the coolant stored in the coolant supply device to a set temperature is mounted. The coolant temperature controller 600 adopts a technique for preventing the coolant from freezing and operator's hands from getting cold even in cold weather.

Hereinafter, the construction and operation of the wet saw according to an embodiment of the present invention will be described in detail.

The base member 100 supports the wet saw on the ground.

The guide rail 200 may be a cylindrical bar that is fixed to both sides of an upper surface of the base member 100.

The support member 300 is to fix a material (not illustrated) such as a tile and so on and to make the fixed material to move forward or backward. The support member 300 is slidably engaged with the guide rail 200 to move along the guide rail 200. Prominence and depression parts are radially formed on the upper surface of the support member 300 to prevent the material arranged on the support member from slipping.

The electric cutting device 400, which is to cut the material arranged on the support member 300, includes a motor 410 coupled to the base member 100, and a cutter blade 420 engaged with the motor 410 through a belt or chain to be rotated by a driving power of the motor 410.

The coolant supply device 500, which is to cool the generated heat when the rotating cutter blade 420 and the material are in close contact with each other, includes a coolant accommodating space 110 is formed on the upper surface of the base member 100, a pump (not illustrated) pumping the coolant stored in the coolant accommodating space 110 of the base member 100, and a coolant hose 430 spraying the coolant pumped by the pump on a part where the cutter blade 420 and the material are in close contact with each other.

In operation, when the motor 410 of the electric cutting device 400 is driven after the material is arranged on the support member 300, the cutter blade 420 is rotated.

In this state, if the support member 300, on which the material is arranged, is slid along the guide rail 200, the material is cut by the cutter blade 420 as it becomes in close contact with the cutter blade 420.

Simultaneously with the driving of the electric cutting device, the pump 510 of the coolant supply device 500 is driven to supply the coolant to the part where the material and the cutter blade 420 becomes in close contact with each other through the coolant hose 430, and thus the damage of the cutter blade 420 is prevented.

The construction and operation of the coolant temperature controller will now be described.

The coolant temperature controller 600 is a device for sensing the temperature of the coolant stored in the coolant accommodating space 110 and heightening the temperature of the coolant to a set temperature of 1° to 15°, and preferably, below 10°, through a heating element.

Figure 3:
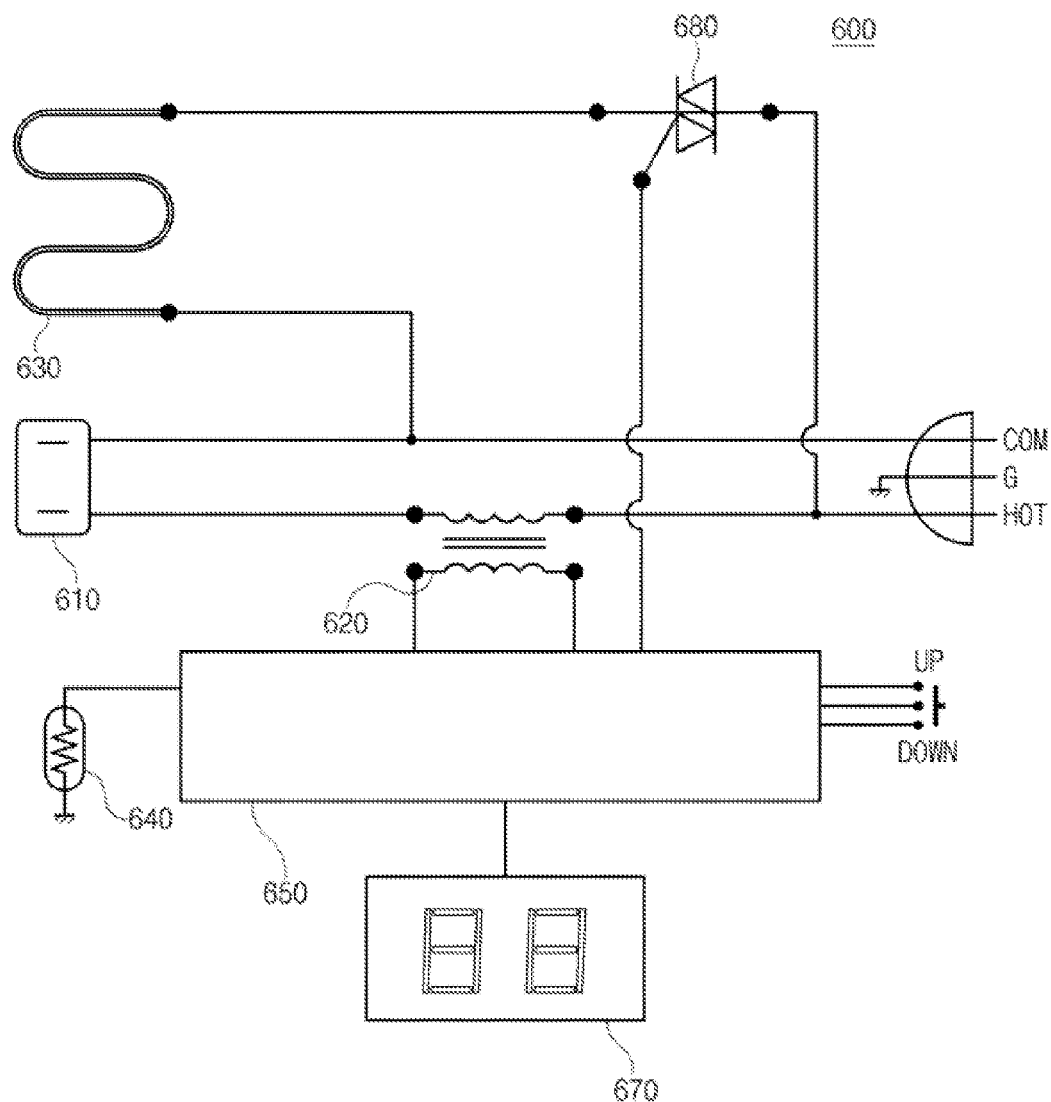
FIG. 3 is a view schematically illustrating the construction of a coolant temperature control apparatus according to an embodiment of the present invention.

The coolant temperature controller 600, as illustrated in FIG. 3, includes a power supply connector 610 connecting an external power supply to the coolant temperature controller, a transformer 620 detecting current applied from the power supply connector 610, a heating element 630 heightening the temperature of the coolant accommodated in the coolant accommodating space 110 to a set temperature, and a microprocessor 650 controlling the temperature of the coolant by controlling the current applied to the heating element 630.

Here, the heating element 630 is positioned in the coolant stored in the coolant accommodating space 110, and includes a heating coil for a cooling hose.

The coolant temperature controller 600 further includes a temperature sensor 640 that measures the temperature of the coolant stored in the coolant accommodating space 110, and transfers the measured temperature to the microprocessor 650.

That is, the microprocessor 650 controls the current applied to the heating element 630 on the basis of the measured temperature of the coolant transferred from the temperature sensor 640, and thus can accurately control the temperature of the coolant to the set temperature.

The coolant temperature controller 600 further includes a display part 670 displaying the measured temperature of the coolant transferred to the microprocessor 650 through the temperature sensor 640, and thus the present temperature of the coolant can be confirmed through the display part 670.

The coolant temperature controller 600 further includes a triac 680 controlling the current applied to the heating element 630 so as to control the temperature of the coolant to the set temperature.

The triac 680 can control (i.e. can rapidly change) the ratio of current supply in the range of 0% (corresponding to current interception) to 100% (corresponding to full current supply).

The coolant temperature controller 600 is detachably mounted on one side of an outer surface of the base member 100 of the wet saw. The coolant temperature controller 600 may be separately purchased to be coupled to a general saw having no coolant temperature controller.

Accordingly, by combining the coolant temperature controller 600 to the wet saw, the coolant can be prevented from freezing and operator's hands can be prevented from getting cold even in cold weather below zero. The coolant temperature controller 600 can be compatibly applied to all kinds of wet saws.

On the other hand, the electric cutting device 400 of a large-capacity special wet saw requires a large amount of start current, and in the case of using the coolant temperature controller 600 simultaneously with the electric cutting device 400, the coolant temperature controller is temporarily brought to a standstill during the initial operation of the electric cutting device 400 in order to prevent the trap of a circuit breaker due to the excessive initial current.

Even though the coolant temperature controller 600 is temporarily brought to a standstill, it does not greatly affect the temperature of the coolant. In the case of a small-capacity electric cutting device, it is not required to temporarily stop the operation of the coolant temperature controller 600.

Hereinafter, the operation of the coolant temperature controller as constructed above will be described.

If an operation switch (not illustrated) provided in the electric cutting device 400 is clicked in a state where the power supply is connected to the wet saw after the material is arranged on the support member 300, the motor 410 is driven to rotate the cutter blade 420.

In this state, if an operator slides the support member 300, on which the material is arranged, along the guide rail 200 in a direction of the cutter blade 420, the material is cut by the cutter blade 420 as it becomes in close contact with the cutter blade 420.

At this time, the coolant supplied from the coolant supply device 500 is sprayed on the part where the cutter blade 420 and the material are in close contact with each other to prevent the heat generation.

On the other hand, in the case of using the wet saw in cold day below zero, the power supply connector 610 of the coolant temperature controller 600, which is mounted on the wet saw, is connected to an external power supply.

Accordingly, the coolant temperature controller 600 senses the temperature of the coolant accommodated in the coolant accommodating space 110 through the temperature sensor 640. If the sensed temperature of the coolant is higher than the set temperature, the current applied to the heating element 630 through the triac 680 is intercepted, while if the sensed temperature is lower than the set temperature, the current is applied to the heating element 630 through the triac 680 to heighten the temperature of the coolant to the set temperature.

The temperature sensed by the temperature sensor 640 and transferred to the microprocessor 650 is displayed on the display part 670 in real time, and through this, the operator can easily confirm the temperature of the coolant.

The temperature of the coolant that is heightened by the coolant temperature controller 600 is transferred to the microprocessor 650 through the temperature sensor 640 in real time, and if the measured temperature transferred to the microprocessor 650 becomes equal to the set temperature, the microprocessor 650 temporarily intercepts the current being applied to the heating element 630 through the triac 680.

Accordingly, the coolant, of which the temperature is heightened to the set temperature through the coolant temperature controller 600, is sprayed on the cutter blade 420, and thus the operator's hands are prevented from getting cold even if the operator's hands are spattered with the coolant by the rotating cutter blade 420.

On the other hand, in order to prevent the coolant passing through the coolant hose 430 from freezing, the coolant temperature controller may be provided with an auxiliary heating element 660 which surrounds an outer periphery of the coolant hose 430 in the form of a coil, or is installed inside the coolant hose 430.

The auxiliary heating element 660, which is connected to the power supply through the transformer 630, generates heat to heighten the temperature of the coolant passing through the coolant hose 430 under the control of the microprocessor 650.

As described above, according to the coolant temperature control apparatus for a wet saw according to the preferred embodiment of the present invention, since the coolant temperature controller for heightening the temperature of the coolant to a set temperature is mounted on the wet saw, the tile cutting work can be efficiently performed even in cold weather below zero, and the work continuity can be heightened in comparison to the conventional wet saw which requires the supply of hot water.

Although preferred embodiments of the present invention have been described for illustrative purposes, those skilled in the art will appreciate that various modifications, additions and substitutions are possible, without departing from the scope and spirit of the invention as disclosed in the accompanying claims.

What is claimed is:

1. A coolant temperature control apparatus for a wet saw, comprising:
   a support member on which a material to be cut is arranged;
   an electric cutting device for cutting the material arranged on the support member;
   a coolant supply device for cooling heat generated during operation of the electric cutting device; and
   a coolant temperature controller for heightening the temperature of coolant stored in the coolant supply device,
   the coolant temperature controller comprising:
   a power supply connector;
   a transformer for detecting current applied from the power supply connector;
   a heating element for heightening the temperature of the coolant stored in the coolant supply device by using the current applied to the transformer; and
   a microprocessor for controlling the temperature of the coolant by controlling the current applied to the heating element,
   wherein the coolant temperature controller is detachably mounted on one side of an outer surface of the wet saw.

2. The apparatus of claim 1, wherein the heating element is positioned in the coolant stored in the coolant supply device.

3. The apparatus of claim 1, wherein the coolant temperature controller further comprises a temperature sensor for measuring the temperature of the coolant stored in the coolant supply device to obtain a measured temperature and transferring the measured temperature to the microprocessor.

4. The apparatus of claim 3, wherein the coolant temperature controller further comprises a display part displaying the measured temperature of the coolant transferred to the microprocessor by the temperature sensor.

5. The apparatus of claim 3, wherein the heating element is positioned in the coolant stored in the coolant supply device.

6. The apparatus of claim 1, wherein the coolant temperature controller further comprises a triac for intercepting or supplying the current applied to the heating element if the temperature of the coolant stored in the coolant supply device is high or low; wherein the microprocessor controls the temperature of the heating element using the triac.

7. The apparatus of claim 1, wherein the coolant temperature controller heightens the temperature of the coolant stored in the coolant supply device by 1° C. to 15° C.

8. The apparatus of claim 1, wherein the coolant temperature controller is temporarily brought to a standstill when the electric cutting device is operated.

9. The apparatus of claim 1, wherein the coolant supply device comprises:
   a base member on which a coolant accommodating space is formed;
   a pump pumping the coolant accommodated in the coolant accommodating space; and
   a coolant hose spraying the coolant pumped by the pump on a part where a cutter blade and a material to be cut are in close contact with each other.

10. The apparatus of claim 9, wherein the coolant temperature controller further comprises an auxiliary heating element provided in the coolant hose to heat the coolant passing through the coolant hose.

11. The apparatus of claim 10, wherein the support member is mounted on a guide rail installed on an upper surface of the base member to be slid along the guide rail.

* * * * *